United States Patent [19]

Kim

[11] Patent Number: 5,853,608
[45] Date of Patent: Dec. 29, 1998

[54] LOW TEMPERATURE SINTERING RADIO FREQUENCY SOFT FERRITE MATERIAL, AND METHOD FOR MANUFACTURING A WIRE COILING INDUCTOR CORE USING SUCH MATERIAL

[75] Inventor: Chang Sik Kim, Suwon-si, Rep. of Korea

[73] Assignee: Samsung Electro-Mechanics Co., Ltd., Kyongki-do, Rep. of Korea

[21] Appl. No.: 879,201

[22] Filed: Jun. 19, 1997

[30] Foreign Application Priority Data

Nov. 30, 1996 [KR] Rep. of Korea ................. 1996 60292

[51] Int. Cl.[6] ............................... C03C 4/00; C03C 8/14; H01F 1/01
[52] U.S. Cl. ..................... 252/62.6; 252/62.62; 501/32; 501/49; 501/79
[58] Field of Search ............................. 252/62.6, 62.62; 501/32, 49, 79

[56] References Cited

U.S. PATENT DOCUMENTS 4,741,849  5/1988  Naito et al. ............................... 501/32
5,252,521  10/1993 Robets ...................................... 501/17

FOREIGN PATENT DOCUMENTS 573068    3/1959  Canada ................................. 252/62.6
60-210572 10/1985 Japan .
64-45771  2/1989  Japan .

*Primary Examiner*—Melissa Bonner
*Attorney, Agent, or Firm*—Lowe Hauptman Gopstein Gilman & Berner

[57] ABSTRACT

A radio frequency soft ferrite material for manufacturing a device for shielding radio frequencies such as wire coiling inductors and chip components including chip inductors and chip beads is disclosed. Particularly, an Ni—Cu—Zn soft ferrite material and a method for manufacturing a wire coiling type or chip type inductor using the ferrite material are disclosed, in which a low temperature sintering is possible, the variations of the electromagnetic properties are low as against an external stress, and the radio frequency characteristics are superior. A $B_2O_3$—$Bi_2O_3$—ZnO glass is added in an amount of 1–25 wt % to the ordinary Ni—Cu—Zn soft ferrite powder, and this mixture is sintered at a temperature of 860°–910° C.

28 Claims, No Drawings

LOW TEMPERATURE SINTERING RADIO FREQUENCY SOFT FERRITE MATERIAL, AND METHOD FOR MANUFACTURING A WIRE COILING INDUCTOR CORE USING SUCH MATERIAL

BACKGROUND OF THE INVENTION

1. Field of the Invention

The present invention relates to a radio frequency soft ferrite material for manufacturing devices for shielding radio frequencies such as wire coiling inductors and chip components including chip inductors and chip beads. The present invention also relates to a method for manufacturing a radio frequency inductor core by using certain ferrite material. More specifically, present invention relates to an Ni—Cu—Zn soft ferrite material and a method for manufacturing a wire coiling type or chip type inductor core using the ferrite material.

2. Description of the Prior Art

Recent progress in the manufacture of electronic and communication apparatus has led to the production of miniature, thin and easily installable electronic components, creating a new industry. This give rise to new problems such as environmental pollution and communication disorders, which could be previously disregarded. Due to the proliferation of wireless communication apparatus, the electromagnetic environment has been aggravated. Accordingly, the nations of the world enforce electromagnetic impediment regulations (FCC, CISPR, VDE, MIL).

There is a need for an electromagnetic wave impediment removing device (EMI/EMC) since the demand for electronic components has increased.

Further, the application of the soft ferrite material for use in making electronic components such as electromagnetic impediment eliminating devices and power transmission devices has been finely divided based on certain characteristics, frequency bands and the like.

In related manufacturing methods a departure from the conventional powder metallurgical method was observed, and stacked type components were studied and put to practical uses. This method is used in the manufacture of small chip components such as ceramic electronic components.

Generally, the soft ferrite material which is used in manufacturing small chip components such as chip inductors, chip beads, chip arrays, chip LC filters and chip trans requires a high inductance. This soft ferrite material includes Mn—Zn ferrite, Ni ferrite, Ni—Zn ferrite and Ni—Cu—Zn ferrite.

The Mn—Zn ferrite has a high permeability, and shows a low power loss. Therefore, it is used as the magnetic core for power supply transformers power line filters and the like. However, the Mn—Zn ferrite shows a low radio frequency characteristic, and therefore, it cannot be applied to a frequency band over 1 MHz. At present, the magnetic core materials which are usable in the frequency band of over 1 MHz are Ni ferrite, Ni—Zn ferrite, and Ni—Cu—Zn ferrite.

Conventional manufacturing methods for soft ferrite material is carried out in the following manner. A sintering process is carried out at a temperature of 1000°–1400° C. for 1–5 hours. However, the inner electrodes of the electronic components such as the chip inductor and the chip bead filter are made of silver (Ag). The above described sintering temperature exceeds the melting point of Ag (960° C.). Therefore, not only is the sintering temperature too high, but also the manufactured components show much loss at the radio frequencies. Therefore, the required inductance cannot be met. In order to lower the sintering temperature for the soft ferrite material, generally the particle size of the magnetic core material is finely crushed to 0.01–1 $\mu$m. Thus the energy level of the particles is made to reach the ground state (metastable state), and the material moving space between the particles is made to be increased during sintering so as to promote low temperature sintering.

However, the manufacturing method resorting to fine crushing requires expensive facilities and a complicated process, with the result that the manufacturing cost is increased. Further, there is a problem in putting the process to practical use.

As another example, there is a method in which an ingredient such as $B_2O_3$ is used (Japanese Patent Application Laid-open No. Sho-64-45771). There is still another method in which sintering is carried out by adding a flux such as ZnO or $V_2O_5$ to induce a surface spread of the particles (Japanese Patent Application Laid-open No. Sho-60-210572).

However, in the method in which the low melting point compound is added, the behavior of the Co component for improving the frequency characteristics is impeded, thereby lowering the sintering effect. Further, in this method, the additives exist in the liquid phase at a temperature lower than the sintering temperature of the soft ferrite material as the matrix. Therefore, the additives are spread on the grain boundaries to promote sintering. Due to the segregation of additives, an inductance drop and loss occurs. Further, they interact with the inner electrode made of Ag, or are spread on the Ag electrode. Consequently, the magnetic properties (inductance, Q-factor) of the chip inductor are degraded, with the result that the product reliability deteriorates.

SUMMARY OF THE INVENTION

The present invention is intended to overcome the above described disadvantages of the conventional techniques.

Therefore it is an object of the present invention to provide an Ni—Cu—Zn soft ferrite material in which there are added composite glass powders exhibiting minimum deterioration of the electromagnetic properties even after reaction with the main ingredient of the matrix, and showing no interaction with the inner Ag electrode, so that the stability of the inner electrode can be ensured at a low sintering temperature, and that superior characteristics can be ensured at a radio frequency band of 10 MHz–500 MHz.

It is another object of the present invention to provide a method for manufacturing a wire coiling inductor or a chip inductor by using the Ni—Cu—Zn soft ferrite material and by carrying out a low temperature sintering.

In achieving the above objects, the Ni—Cu—Zn low temperature sintering radio frequency soft ferrite material according to the present invention includes a raw material composed of (in mole %): 40.0–51.0% of $Fe_2O_3$, 1.0–10.0% of CuO, 38.0–48.0% of NiO, and 1.0–10.0% of ZnO, and the soft ferrite material further includes in weight %: 1–25% of $B_2O_3$—$Bi_2O_3$—ZnO glass.

In another aspect of the present invention, the Ni—Cu—Zn low temperature sintering radio frequency shielding soft ferrite material according to the present invention includes a raw material composed of (in mole %): 40.0–51.0% of Fe2O3, 1.0–10.0% of CuO, 38.0–48.0% of NiO, and 1.0–10.0% of ZnO, and the soft ferrite material further includes (in weight %): one compound or more selected from the group consisting of 2.0% or less of $Co_2O_3$, 3.0% or less of Co$_3$O$_4$ and 2.0% or less of SiO$_2$; and 1–25% of B$_2$O$_3$—Bi$_2$O$_3$—ZnO glass.

In still another aspect of the present invention, the method for manufacturing a wire coiling inductor according to the present invention includes the steps of:

adding 1–25 wt % of B$_2$O$_3$—Bi$_2$O$_3$—ZnO glass to a raw material composed of (in mole %): 40.0–51.0% of Fe$_2$O$_3$, 1.0–10.0% of CuO, 38.0–48.0% of NiO, and 1.0–10.0% of ZnO, and crushing and drying them to form a dried powder;

mixing the dried powder with 5–15 wt % of a binder with 5–10 wt % of a main agent and 5–16 wt % of a reaction inhibiting agent added therein, and making coarse particles from the mixture; and carrying out a forming step using the coarse particles, and a sintering at a temperature of 860°–910° C.

In still another aspect of the present invention, the method for manufacturing a wire coiling inductor according to the present invention includes the steps of:

mixing a ferrite powder composed of (in mole %): 40.0–51.0% of Fe$_2$O$_3$, 1.0–10.0% of CuO, 38.0–48.0% of NiO, and 1.0–10.0% of ZnO, with one compound selected from the group consisting of (in weight %) 2.0% or less of Co$_2$O$_3$, 3.0% or less of Co$_3$O$_4$ and 2.0% or less of SiO$_2$; and 1–25 wt % of B$_2$O$_3$—Bi$_2$O$_3$—ZnO glass, and crushing and drying the mixture;

mixing the dried powder with 5–15 wt % of a binder with 5–10 wt % of a main agent and 5–16 wt % of a reaction inhibiting agent contained therein, and making coarse particles from the mixture; and carrying out a forming step by using the coarse particles, and sintering at a temperature of 860°–910° C.

In still another aspect of the present invention, the method for manufacturing a chip inductor according to the present invention includes the steps of:

adding 1–25 wt % of B$_2$O$_3$—Bi$_2$O$_3$—ZnO glass to a raw material composed of (in mole %): 40.0–51.0% of Fe$_2$O$_3$, 1.0–10.0% of CuO, 38.0–48.0% of NiO, and 1.0–10.0% of ZnO, and crushing and drying them to form a dried powder;

adding a binder to the dried powder at a ratio of 1:1–1:4, and casting a plurality of green sheets with a doctor blade;

stacking a plurality of the green sheets, printing an inner Ag electrode upon the stacked sheets, stacking again a plurality of the green sheets, and sintering the structure at a temperature of 860°–910° C.; and forming an outer electrode on the sintered body.

In still another aspect of the present invention, the method for manufacturing a chip inductor according to the present invention includes the steps of:

mixing a raw material composed of (in mole %): 40.0–51.0% of Fe$_2$O$_3$, 1.0–10.0% of CuO, 38.0–48.0% of NiO, and 1.0–10.0% of ZnO, with one compound selected from the group consisting of (in weight %): 2.0% or less of Co$_2$O$_3$, 3.0% or less of Co$_3$O$_4$ and 2.0% or less of SiO$_2$; and 1–25 wt % of B$_2$O$_3$—Bi$_2$O$_3$—ZnO glass, and drying the mixture;

adding a binder to the dried powder at a ratio of 1:1–1:4, and casting a plurality of green sheets with a doctor blade;

stacking a plurality of the green sheets, printing an inner Ag electrode upon the stacked sheets, stacking again a plurality of the green sheets, and sintering the structure at a temperature of 860°–910° C. (e.g. maintained for less than 5 hours); and forming an outer electrode on the sintered body.

DESCRIPTION OF THE PREFERRED EMBODIMENT

Generally, magnetic materials are different in the characteristics versus frequency bands depending on the structure and composition. The present invention provides a Ni—Cu—Zn soft magnetic ferrite in which the ZnO ingredient is low and the NiO ingredient is high in relative terms at the required frequency band (10 MHz–500 MHz). Basically, the composition showing this radio frequency characteristic should preferably be a ferrite powder composed of (in mole %) 40.0–51.0% of Fe$_2$O$_3$, 1.0–10.0% of CuO, 38.0–48.0% of NiO, and 1.0–10.0% of ZnO. More preferably, in order to manufacture a low loss chip for the radio frequency band, one compound selected from among a group consisting of 2.0% or less of Co$_2$O$_3$, 3.0% or less of Co$_3$O$_4$ and 2.0% or less of SiO$_2$ should be added to the above described magnetic powder.

Further, in the present invention, a B$_2$O$_3$—Bi$_2$O$_3$—ZnO glass is added in an amount of 1–25 wt % to the above described mixture.

The addition of the above mentioned glass brings advantages such that the degradation of the electromagnetic properties can be minimized even after reaction with the soft magnetic matrix. Particularly, in the case of a chip inductor, no reaction occurs with an inner electrode made of Ag, and the sintering temperature is lowered, these being further advantages.

If the glass is added in an amount of 1–25 wt %, the sintering temperature for the matrix can be brought down from the conventional temperature of 1000°–1350° C. (i.e. the sintering temperature when the conventional low melting point compound (Bi$_2$O$_3$ or V$_2$O$_5$) is used) to 860°–910° C. In this case, the stress which occurs during shrinkage of the matrix and the inner electrode after sintering can be reduced so that the inner electrode can be made stable.

Particularly, the behavior of the glass within the matrix raises the density of the matrix, so that the material of the present invention can maintain a sintering density higher than that (about 4.5–4.8 g/cc) of the general soft ferrite material. Consequently, the mechanical strength can be improved and, due to the high surface denseness, adherence of foreign materials is inhibited during electroplating, thereby improving the manufacturing yield.

The glass used in the present invention is preferably composed of (in weight %): 10–40% of B$_2$O$_3$, 20–40% of Bi$_2$O$_3$ and 20–70% of ZnO.

In the inductor manufactured by using the soft ferrite material according to the present invention, the particle size of the added glass should preferably be 0.1–10 μm. More preferably, in order to prevent the growth of large grains due to the deviated distribution of the matrix, the particle size of the glass should be 0.2–5 μm.

The glass may additionally contain 0.01–10 wt % of SiO$_2$. If SiO$_2$ is added into the magnetic powder, a high quality factor can be obtained, although the inductance may become low.

The method for manufacturing a wire coiling inductor using the dried powder containing the glass according to the present invention now be described.

In the case of the wire coiling inductor, after drying the powder containing the glass, 5–15 wt % of a binder with 5–10 wt % of a main ingredient and 5–16 wt % of a reaction inhibiting agent contained therein is immediately added. The main ingredient may be any usual material typically used when manufacturing a sintered core. For example, polyvinyl alcohol (PVA) or methyl cellulose may be used. Meanwhile, the reaction inhibiting agent plays the role of preventing the agglomeration of the soft magnetic particles, and this material may be mannitol or propylene glycol (PEG).

In the present invention, the dried powder may be calcinated as in the usual case, but the same characteristics may be obtained even without carrying out calcination. In the case where the dried powder is calcinated, the calcination temperature should preferably be 700°–900° C.

The powder is then made into coarse particles and forming is carried out to produce a desired fabricated body. The fabricated body is sintered at a temperature of 860°–910° C. which is a temperature much lower than that of the usual case in which the usual low melting point compound is contained. During the sintering, the temperature interval of 750°–900° C. is that in which the grains are aligned and are made dense. Therefore, if the temperature is raised abruptly, pores or cavities may be formed with the result that permeability is lowered, and quality factor is degraded. Therefore, it should be preferred that an abrupt temperature raising be avoided. For example, in the above mentioned temperature interval, the temperature raising should preferably be done at a rate of about 10° C./minute.

Further, after attaining the sintering temperature, the sintering temperature is maintained preferably for 5 hours or less, and more preferably for 2–3 hours. During the following cool down to 700° C., abrupt cooling is avoided. If abrupt cooling occurs during this interval, the CuO component is precipitated from the matrix with the result that the electromagnetic properties are degraded. Therefore, during this cool down interval, the cooling rate should preferably be about 5° C./minute or less.

In the present invention, the microstructure is very much stabilized, and the following properties are obtained: the quality factor is 200 or more; the peak region is 25 MHz or more, and the inductance is 1.5 $\mu$H or more. Thus a soft ferrite material having superior radio frequency characteristics can be obtained at a low temperature.

The method for manufacturing a chip inductor by using a dried powder with the above mentioned glass added therein will now be described.

A binder in the form of an organic high molecule such as PVB, methyl cellulose, oleic acid, propylene glycol, toluene or mannitol is added to the dried powder at a ratio of 1:1–1:4. Green sheets then cast by applying the doctor blade process, a plurality of the green sheets are stacked. An inner Ag electrode is printed. A plurality of the green sheets are stacked again. This structure is then sintered at a temperature of 860°–910° C. Which is a level much lower than the conventional level. An outer electrode is formed on the sintered body, to obtain the chip inductor according to the present invention.

The present invention will now be described based on actual example.

EXAMPLE 1

Raw materials were measured into the compositions of Table 1 below. These raw materials were put into a polyurethane jar and crushing and mixing were carried out after adding distilled water at a ratio of 1–3 times the amount of the raw materials and by using YTZ-balls ($Y_2O_3$-zirconia balls), until the average particle size reduced to 1–1.5 $\mu$m. After completion of mixing, a calcination was carried out at a temperature of 700°–900° C. for 2–3 hours, and then, a recrushing was carried out within the same jar. During recrushing, a $10B_2O_3$—$65Bi_2O_3$—$25ZnO$ glass powder was added to the calcinated powder, and the recrushing was carried out for 24–48 hours. When the particle size became 0.1–1.5 $\mu$m, drying was carried out by using a drying machine until the moisture content was 0.2–0.7% per weight unit of the raw materials.

The dried powder was sorted into uniform particle sizes of 60–80 meshes, and then, there was added 5–16 wt % of a binder in which 5–10 wt % of polyvinyl alcohol (PVA) and 5–16 wt % of mannitol were dissolved. The powder was then sorted into a uniform particle size by using a 50-mesh sieve, and fabricated into a toroidal core having an outside diameter of 25 mm, an inside diameter of 18 mm and a height of 4.5 mm. The fabricated structure was then sintered. During sintering, the temperature was raised at a rate of about 2° C./minute up to 420° C., and this temperature was maintained for about 4 hours, thereby carrying out a debindering.

Then up to a temperature of 750° C., the temperature raising was carried out at a rate of about 3° C./minute, and then, up to a temperature of 900OC/minute, the temperature raising was carried out at a rate of 1° C./minute. The temperature of 900° C., then maintained for 2–3 hours and then cooling was performed at a rate of 3° C./minute down to 700° C., with further cooling down to room temperature at a rate of 10° C./minute.

An enameled copper wire having a diameter of 0.55 mm of 20 turns was then wound on the sintered structure. The inductance and the quality factor (Q-factor) were measured at a frequency band of 1 MHz–500 MHz by using an HP4291A network analyzer. The results are shown in Table 1 below.

In Table 1 below, in the case of Inventive Example 13, the calcination was not carried out after drying the magnetic raw material powder.

TABLE 1

| | Chemical composition | | | | | | | | | Sintered density | Inductance | |
|---|---|---|---|---|---|---|---|---|---|---|---|---|
| | Main ingredient (mole %) | | | | Additives (wt %) | | | | | | | |
| Example | $Fe_2O_3$ | NiO | ZnO | CuO | $Co_2O_3$ | $Co_3O_4$ | $SiO_2$ | $Bi_2O_3$ | Glass | (g/cc) | ($\mu$H) | Q peak |
| Inventive Example 1 | 49.5 | 42.5 | 3.0 | 5.0 | — | — | — | — | 4 | 5.01 | 3.89 | 412 |
| Inventive Example 2 | 49.5 | 42.5 | 3.0 | 5.0 | — | — | — | — | 6 | — | 4.23 | 435 |
| Inventive Example 3 | 49.5 | 42.5 | 3.0 | 5.0 | 0.5 | — | — | — | 6 | 5.05 | 2.00 | 380 |
| Inventive | 49.5 | 42.5 | 3.0 | 5.0 | — | 0.5 | — | — | 6 | 5.06 | 3.27 | 460 |

TABLE 1-continued

| | Chemical composition | | | | | | | | | Sintered density | Induc- tance | |
|---|---|---|---|---|---|---|---|---|---|---|---|---|
| | Main ingredient (mole %) | | | | Additives (wt %) | | | | | | | |
| Example | $Fe_2O_3$ | NiO | ZnO | CuO | $Co_2O_3$ | $Co_3O_4$ | $SiO_2$ | $Bi_2O_3$ | Glass | (g/cc) | ($\mu$H) | Q peak |
| Inventive Example 4 | 49.5 | 42.5 | 3.0 | 5.0 | — | 0.5 | 0.5 | — | 6 | 4.92 | 1.58 | 492 |
| Inventive Example 5 | 49.5 | 42.5 | 3.0 | 5.0 | — | 0.5 | — | — | 8 | 5.10 | 5.25 | 332 |
| Inventive Example 6 | 49.5 | 42.5 | 3.0 | 5.0 | — | 0.5 | — | — | 12 | 5.12 | 6.12 | 321 |
| Inventive Example 7 | 48.5 | 44.0 | 1.5 | 6.0 | — | — | 0.4 | — | 6 | — | 2.30 | 480 |
| Inventive Example 8 | 48.5 | 42.5 | 1.5 | 7.5 | — | 0.5 | — | — | 6 | — | 2.50 | 210 |
| Inventive Example 9 | 45.4 | 44.0 | 2.0 | 8.0 | — | 0.5 | — | — | 6 | — | 3.12 | 275 |
| Inventive Example 10 | 48.8 | 38.2 | 8.0 | 5.0 | — | 0.6 | 0.3 | — | 6 | — | 2.12 | 321 |
| Inventive Example 11 | 48.2 | 47.5 | 3.2 | 1.1 | — | 0.8 | 0.8 | — | 6 | — | 1.56 | 412 |
| Inventive Example 12 | 49.5 | 42.5 | 3.0 | 5.0 | — | 0.5 | — | — | 6 | 5.03 | 1.98 | 360 |
| Inventive Example 13 | 49.5 | 42.5 | 3.0 | 5.0 | — | 0.5 | — | 1.0 | — | 4.58 | 1.98 | 125 |
| Comparative Example 1 | 49.5 | 42.5 | 3.0 | 5.0 | — | 0.5 | — | — | 28 | 5.16 | 5.12 | 196 |
| Comparative Example 2 | 44.0 | 34.5 | 16.5 | 5.0 | — | 0.5 | 0.5 | — | 6 | — | 7.12 | 121 |
| Comparative Example 3 | 51.5 | 32.5 | 11.0 | 5.5 | — | 0.5 | — | — | 6 | — | 1.91 | 172 |
| Comparative Example 4 | | | | | | | | | | | | |

As shown in Table 1 above, in the case of the Inventive Examples 1–12 in which the conditions of the present invention were satisfied, it was confirmed that not only is low temperature sintering possible, but also the density of the sintered soft ferrite material was as high as 4.8 g/cc. The inductance value was more than 1.5 $\mu$H, and the quality factor Q was about 250. This demonstrates superior radio frequency characteristics. Particularly, where $SiO_2$ was added as in Inventive Examples 8, 10 and 11, $SiO_2$ was present on the grain boundaries, thereby inhibiting the grain growth. Therefore, the surface areas of the grain boundaries were increased so as to make it possible to obtain a high quality factor, but the inductance was steeply decreased.

Further, as in the case of Inventive Example 13, a soft ferrite material having the same radio frequency characteristics can be obtained even without carrying out the calcination.

Meanwhile, in the case of Comparative Example 1, the glass was not added, but a $Bi_2O_3$ additive was added. Therefore, the sintering was not sufficiently carried out, and shows a low quality factor. The reason is that the grain boundary diffusion cannot occur with only the $Bi_2O_3$ component. In the case of Comparative Example 2, too much glass was added in relative terms. Therefore, the sintered density was very high after low temperature sintering, but the radio frequency characteristics were degraded. In the case of Comparative Examples 3 and 4 in which the compositions depart basically from that of the present invention, the inductance and the quality factor were too low in the radio frequency band after the low temperature sintering, and therefore, the radio frequency characteristics were degraded.

EXAMPLE 2

In order to see the radio frequency characteristics versus the kinds of the glass, glasses having different physical properties as shown in Table 2 below were added to the magnetic powders having the same composition as in Example 1. Then the respective materials were fabricated into a toroidal body and sintered. The electromagnetic properties were then measured, and the results are shown in Table 3 below. Before the measurements, an enameled copper wire having a diameter of 0.55 mm was wound on the toroidal body by 20 turns, and then, the measurement was carried out with an HP4194A impedance analyzer.

TABLE 2

| | Ingredient (wt %) | | | | | Thermal expansion | Density | Particle size | Softening point | Melting temp. |
|---|---|---|---|---|---|---|---|---|---|---|
| | $B_2O_3$ | $Bi_2O_3$ | ZnO | $SiO_2$ | Na | ($10^{-7}$/°C.) | (g/cc) | ($\mu$m) | (°C.) | (°C.) |
| Inventive material a | 10 | 65 | 25 | — | — | 75.3 | 5.60 | 1.08 | 522 | 900 |
| Inventive material b | 15 | 65 | 20 | — | — | 69.0 | 5.01 | 7.10 | 452 | 900 |

TABLE 2-continued

| | Ingredient (wt %) | | | | | Thermal expansion $(10^{-7}/°C.)$ | Density (g/cc) | Particle size ($\mu$m) | Softening point (°C.) | Melting temp. (°C.) |
|---|---|---|---|---|---|---|---|---|---|---|
| | $B_2O_3$ | $Bi_2O_3$ | ZnO | $SiO_2$ | Na | | | | | |
| Inventive material c | 10 | 55 | 35 | — | Tr | 71.0 | 4.90 | 5.30 | 464 | 900 |
| Inventive material d | 10 | 60 | 30 | — | Tr. | 78.6 | 4.95 | 1.30 | 502 | 870 |
| Inventive material e | 20 | 50 | 20 | 10 | — | 88.0 | 2.62 | 4.52 | 505 | 825 |
| Comparative material A | 20 | — | — | 80 | — | 23.0 | 2.14 | 3.70 | 485 | 1300 |
| Comparative material B | 15 | — | — | 60 | 25 | 84.0 | 3.06 | 5.20 | 486 | 700 |
| Comparative material C | 20 | — | — | 50 | 30 | 64.5 | 2.70 | 4.30 | 491 | 767 |

TABLE 3

| | | Chemical composition | | | | | | | | | |
|---|---|---|---|---|---|---|---|---|---|---|---|
| | | Main ingredients (mole %) | | | | Additives (wt %) | | | Inductance | Q | |
| Example | Glass | $Fe_2O_3$ | NiO | ZnO | CuO | $Co_2O_3$ | $Co_3O_4$ | Glass | ($\mu$H) | Qp | Qf (MHz) |
| Inventive example 1 | a | 49.5 | 42.5 | 3.0 | 5.0 | — | — | 4 | 3.8 | 350 | 25 |
| Inventive example 14 | a | 49.5 | 42.5 | 3.0 | 5.0 | 0.5 | — | 4 | 2.0 | 380 | 32 |
| Inventive example 15 | b | 49.5 | 42.5 | 3.0 | 5.0 | 0.5 | — | 4 | 2.8 | 420 | 42 |
| Inventive example 16 | c | 49.5 | 42.5 | 3.0 | 5.0 | 0.5 | — | 4 | 3.2 | 290 | 28 |
| Inventive example 17 | d | 49.5 | 42.5 | 3.0 | 5.0 | 0.5 | — | 4 | 2.2 | 452 | 43 |
| Inventive example 18 | d | 49.5 | 42.5 | 3.0 | 5.0 | — | 0.5 | 4 | 2.6 | 520 | 42 |
| Inventive example 19 | e | 49.5 | 42.5 | 3.0 | 5.0 | 0.5 | — | 4 | 3.1 | 390 | 25 |
| Comparative example 5 | A | 49.5 | 42.5 | 3.0 | 5.0 | 0.5 | — | 4 | 1.1 | 625 | 35 |
| Comparative example 6 | B | 49.5 | 42.5 | 3.0 | 5.0 | 0.5 | — | 4 | 1.2 | 225 | 24 |
| Comparative example 7 | C | 49.5 | 42.5 | 3.0 | 5.0 | 0.5 | — | 4 | 1.0 | 310 | 30 |

Referring to Tables 2 and 3, it can be seen that the electromagnetic properties of the manufactured soft ferrite material varied greatly in accordance with the variation of the composition of the glass which causes the deformation temperature point and the thermal expansion of the glass to be made different. That is, in the cases of Inventive Examples 1, and 14–18 in which Inventive Materials a-d were used, and in which the glass was composed of 10–40% of $B_2O_3$, 20–70% of $Bi_2O_3$ and 20–40% of ZnO to meet the conditions of the present invention, there was seen that the radio frequency inductance value was 2.0 $\mu$H or more, the quality factor was 250 or more, and the quality factor peak band (Q peak band) was 25 MHz or more in all these cases.

Further, even when a small amount of $SiO_2$ was added into the glass which satisfied the required composition, the properties were similar to those of Inventive Example 1.

On the other hand, in the cases of Comparative Examples 5–7 in which the $B_2O_3$—$SiO_2$ glasses (Comparative Materials A–C) were used, either the inductance value was too low or the quality factor was too small, thereby aggravating the radio frequency characteristics.

EXAMPLE 3

The materials having the compositions of Table 1 were made into powders by applying the method of Example 1. Then a PVB-mannitol binder was added at a ratio of 1:1–1:4. The mixture was sorted into uniform particles by using a 200–325-mesh sieve. Green sheets having a thickness of 10–200 $\mu$m were cast by applying the doctor blade process.

A plurality of the cast green sheets were stacked, an inner Ag electrode was printed on the stacked sheets, and then, a plurality of the green sheets were stacked again. Sintering was carried out. The inner electrode of the sintered body consisted of one single turn, and the sintering was carried out at a temperature of 880°–910° C. for 1–3 hours. Then an outer electrode was formed on the sintered body, thereby completing a chip inductor. For a plurality of the chip inductors manufactured in this manner, the electromagnetic properties were measured by using an HP4192A network analyzer, and the measured results are shown in Table 4 below.

TABLE 4

| Example | Chemical composition | | | | | | | | | Inductance at 10 MHz (nH) | Peak value |
|---|---|---|---|---|---|---|---|---|---|---|---|
| | Main ingredients (mole %) | | | | Additives (wt %) | | | | | | |
| | Fe$_2$O$_3$ | NiO | ZnO | CuO | Co$_2$O$_3$ | Co$_3$O$_4$ | SiO$_2$ | Bi$_2$O$_3$ | Glass | | |
| Inventive example 20 | 49.5 | 42.5 | 3.0 | 5.0 | 0.5 | — | — | — | 6 | 21.3 | 62 |
| Inventive example 21 | 49.5 | 42.5 | 3.0 | 5.0 | — | 0.5 | 0.5 | — | 6 | 15.7 | 74 |
| Inventive example 22 | 48.5 | 42.5 | 1.5 | 7.5 | — | 0.5 | — | — | 6 | 24 | 43 |
| Inventive exampie 22 | 48.2 | 47.5 | 3.2 | 1.1 | — | 0.8 | 0.8 | — | 6 | 15.2 | 69 |
| Inventive example 23 | 50.5 | 41.5 | 4.5 | 3.5 | — | 0.3 | 0.2 | — | 6 | 21.2 | 40 |
| Inventive example 24 | 50.5 | 43.0 | 1.5 | 5.0 | — | — | 0.5 | — | 6 | 19.4 | 38 |
| Inventive example 25 | 48.5 | 44.0 | 1.5 | 6.0 | — | 0.5 | — | 1.0 | 4 | 22 | 35 |

As shown in Table 4 above, in the cases of Inventive Examples 20–25 which satisfy the conditions of the present invention, low temperature sintering was possible. Further, the inductance value of the soft ferrite material after sintering was more than 15 nH, and the quality factor at the radio frequency band was 35 or more. Thus it was confirmed that they had superior electromagnetic properties. That is, the chip inductor of the present invention showed advantages compared with the conventional chip inductor in which the glass and the Co additives were not added at all. That is, in the present invention, the sintering temperature was as low as 880° C., and the loss after sintering was significantly low.

According to the present invention as described above, the sintering is sufficiently proceeded even at a low temperature, so that a soft ferrite material having superior radio frequency characteristics can be obtained. Further, in manufacturing this material, existing facilities can be used. Therefore, an investment in expensive facilities is not necessary and the difficulties in managing such facilities can be avoided. Accordingly, the soft ferrite material for chip inductors can be manufactured at a cheap cost.

What is claimed is:

1. An Ni—Cu—Zn low temperature sintering radio frequency soft ferrite material comprising: a raw material composed of in mole %: 40.0–51.0% of Fe$_2$O$_3$, 1.0–10.0% of CuO, 38.0–48.0% of NiO, and 1.0–10.0% of ZnO, and the soft ferrite material further comprising in weight %: 1–25% of B$_2$O$_3$—Bi$_2$O$_3$—ZnO glass.

2. The Ni—Cu—Zn low temperature sintering radio frequency soft ferrite material as claimed in claim 1, further comprising in weight %: one compound or more selected from a group consisting of 2.0% or less of Co$_2$O$_3$, 3.0% or less of Co$_3$O$_4$ and 2.0% or less of SiO$_2$.

3. The Ni—Cu—Zn low temperature sintering radio frequency soft ferrite material as claimed in claim 1, wherein said glass is composed of in weight %: 10–40% of B$_2$O$_3$, 20–40% of Bi$_2$O$_3$ and 20–70% of ZnO.

4. The Ni—Cu—Zn low temperature sintering radio frequency soft ferrite material as claimed in claim 3, wherein said glass further comprises 0.01–10 wt % of SiO$_2$.

5. The Ni—Cu—Zn low temperature sintering radio frequency soft ferrite material as claimed in claim 4, wherein said soft ferrite material has a density of 4.8 g/cc or more after a sintering.

6. A method for manufacturing a wire coiling inductor core, comprising the steps of:

adding 1–25 wt % of B$_2$O$_3$—Bi$_2$O$_3$—ZnO glass to a raw material composed of in mole %: 40.0–51.0% of Fe$_2$O$_3$, 1.0–10.0% of CuO, 38.0–48.0% of NiO, and 1.0–10.0% of ZnO, and crushing and drying them to form a dried powder;

mixing said dried powder with 5–15 wt % of a binder with 5–10 wt % of a main agent and 5–16 wt % of a reaction inhibiting agent contained therein, to form a mixture, and making coarse particles from the mixture; and forming the coarse particles, and sintering the resulting body at a temperature of 860°–910° C.

7. The method as claimed in claim 6, wherein said ferrite powder further comprises in weight %: one compound or more selected from a group consisting of 2.0% or less of Co$_2$O$_3$, 3.0% or less of Co$_3$O$_4$ and 2.0% or less of SiO$_2$.

8. The method as claimed in claim 6, wherein said glass is composed of in weight %: 10–40% of B$_2$O$_3$, 20–40% of Bi$_2$O$_3$ and 20–70% of ZnO.

9. The method as claimed in claim 8, wherein said glass further comprises 0.01–10 wt % of SiO$_2$.

10. The method as claimed in claim 8, wherein said glass has a particle size range of 0.1–10 μm.

11. The method as claimed in claim 10, wherein said glass has a particle size range of 0.2–5 μm.

12. The method as claimed in claim 6, wherein said powder is calcinated after drying it.

13. The method as claimed in claim 12, wherein said powder is calcinated at a temperature of 700°–900° C.

14. The method as claimed in claim 6, wherein said main agent is polyvinyl alcohol or methyl cellulose.

15. The method as claimed in claim 6, wherein said reaction inhibiting agent is mannitol or propylene glycol.

16. The method as claimed in claim 6, wherein said sintering temperature is maintained for less than 5 hours.

17. The method as claimed in claim 6, wherein, during the sintering, a temperature raising is carried out from 750° C. to 900° C. at a rate of about 10° C./minute or less, and a cooling from 900° C. to 700° C. is carried out at a rate of about 5° C./minute or less.

18. A method for manufacturing a radio frequency chip inductor, comprising the steps of:

adding 1–25 wt % of B$_2$O$_3$—Bi$_2$O$_3$—ZnO glass to a raw material composed of in mole %: 40.0–51.0% of Fe$_2$O$_3$, 1.0–10.0% of CuO, 38.0–48.0% of NiO, and 1.0–10.0% of ZnO, and crushing and drying them to form a dried powder;

adding a binder to the dried powder at a ratio of 1:1–1;4, and casting a plurality of green sheets using a doctor blade process;

stacking a plurality of said green sheets, printing an inner Ag electrode upon the stacked sheets, stacking again a plurality of said green sheets, and sintering the resulting body at a temperature of 860°–910° C.; and forming an outer electrode on the sintered body.

19. The method as claimed in claim 18, wherein said ferrite powder further comprises in weight %: one compound or more selected from a group consisting of 2.0% or less of $Co_2O_3$, 3.0% or less of $Co_3O_4$ and 2.0% or less of $SiO_2$.

20. The method as claimed in claim 18, wherein said glass is composed of in weight %: 10–40% of $B_2O_3$, 20–40% of $Bi_2O_3$ and 20–70% of ZnO.

21. The method as claimed in claim 20, wherein said glass further comprises 0.01–10 wt % of $SiO_2$.

22. The method as claimed in claim 20, wherein said glass has a particle size range of 0.1–10 $\mu$m.

23. The method as claimed in claim 22, wherein said glass has a particle size range of 0.2–5 $\mu$m.

24. The method as claimed in claim 18, wherein said powder is calcinated after drying it.

25. The method as claimed in claim 24, wherein said powder is calcinated at a temperature of 700°–900° C.

26. The method as claimed in claim 18, wherein said binder is a mixture of PVB and mannitol.

27. The method as claimed in claim 18, wherein said sintering temperature is maintained for less than 5 hours.

28. The method as claimed in claim 18, wherein, during sintering, a temperature raising is carried out from 750° C. to 900° C. at a rate of about 10° C./minute or less, and a cooling from 900° C. to 700° C. is carried out at a rate of about 5° C./minute or less.

* * * * *